UNITED STATES PATENT OFFICE.

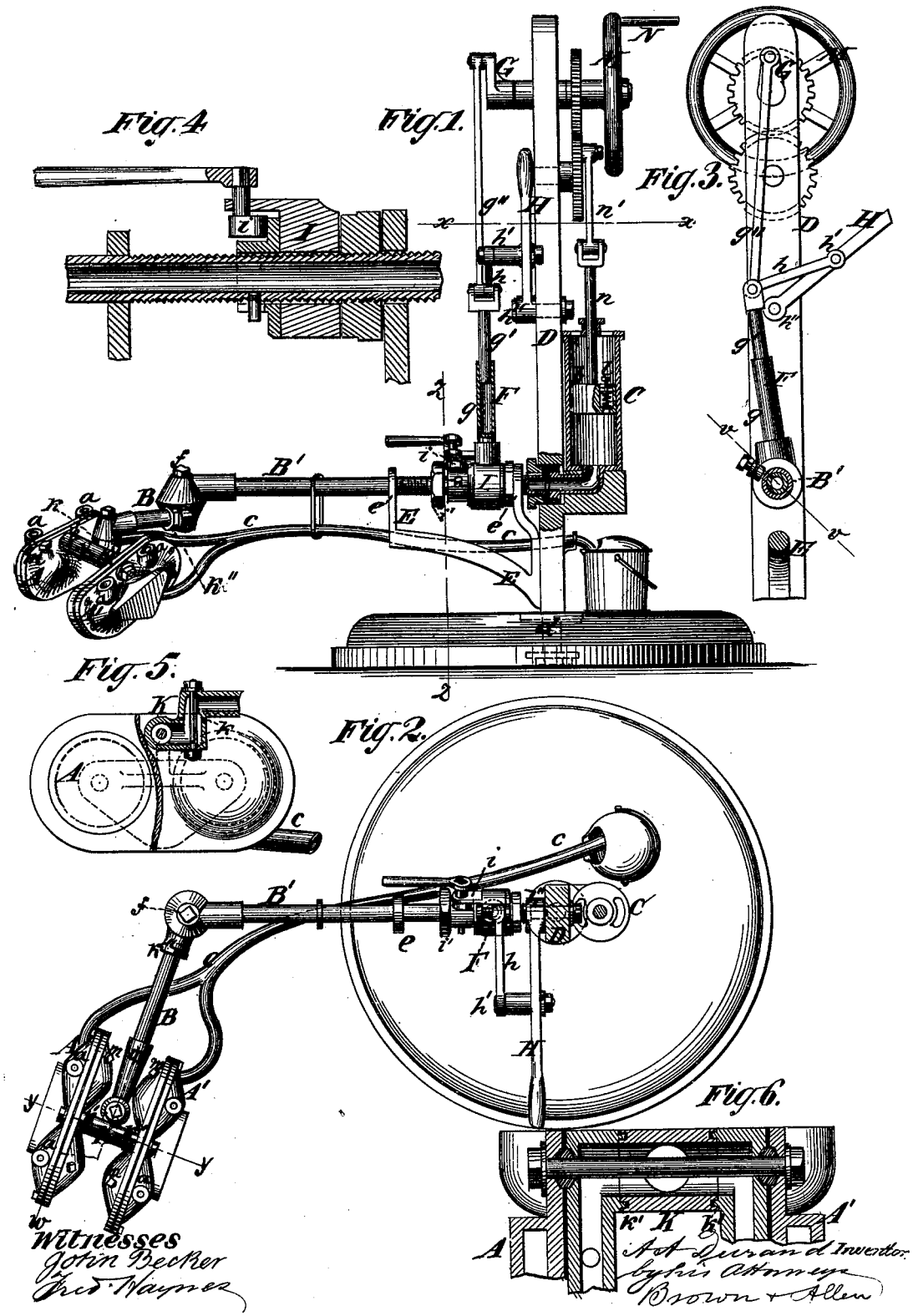

ALBERT A. DURAND, OF NEW YORK, N. Y.

IMPROVEMENT IN MILKERS.

Specification forming part of Letters Patent No. 198,362, dated December 18, 1877; application filed May 31, 1877.

*To all whom it may concern:*

Be it known that I, ALBERT A. DURAND, of the city and State of New York, have invented certain Improvements in Cow-Milking Machines; and I do hereby declare that the following is a full, clear, and exact description of the same, reference being had to the accompanying drawing, forming part of this specification.

My invention relates to the class of machines commonly known as "hydraulic cow-milking machines," and in which a water-column is made to oscillate against an inclosed diaphragm acting as the piston of a pump, in connection with other devices to draw the milk from the udder of a cow, and to discharge the same into a suitable receptacle.

The invention consists in sundry improvements on inventions, Letters Patent for which were granted to L. O. Colvin, respectively numbered and dated as follows: No. 54,865, May 22, 1866; No. 74,507, February 18, 1868; and No. 79,317, June 30, 1868.

The nature of the said improvements is so fully set forth in the specification and the claims as to require no further preliminary recital.

Figure 1 in the accompanying drawing is partly a side elevation and partly a sectional view of a cow-milking machine comprising my invention. Fig. 2 is partly a top view and partly a sectional view of the same, the section being on the line $x\,x$ in Fig. 1. Figs. 3, 4, and 5 are sectional details of the machine. In Fig. 3 the section is made on the line $z\,z$, Fig. 1. In Fig. 4 the section is made nearly on the line $v\,v$ in Fig. 3. In Fig. 5 the section is made on the bent line $w\,w$ in Fig. 2. Fig. 6 is a detail sectional view, the section being made on the line $y\,y$ in Fig. 2.

The essential parts of such a machine are a diaphragm pump or pumps, provided with teat-sockets, and a tube or passage filled with water or other liquid, and leading from one side of the diaphragm in said pump or pumps to a cylinder containing a plunger, which, being caused to reciprocate in the cylinder, causes the liquid column to reciprocate and to move the diaphragm or diaphragms back and forth, said diaphragm or diaphragms acting as a piston or pistons to draw the milk from the udder and discharge the milk into a suitable receptacle.

A and A' in the drawing represent two such diaphragm-pumps, the teat-sockets (not shown) being attached at $a$. B and B' represent united parts of a jointed pipe leading from said pumps A A' to a cylinder, C, in which is fitted the plunger $b$, Fig. 1. Said pumps A A' are fitted with suitable valves and other attachments for drawing milk from a cow's udder and delivering it through a pipe, $c$, into a suitable receptacle.

In the machines of this class hitherto employed, and in those the patents for which are above referred to, the pipes B B' formed the sole support for the diaphragm pump or pumps, and it necessarily had to be made heavy and strong to maintain the weight of said pumps. Said pipe, together with the cylinder C, was attached to a fixed post, to which were also attached the devices for working the apparatus.

In my present invention I attach all the aforementioned parts, as well as others hereinafter described, to a post, D, as was done in those above referred to; but, as an improvement upon that arrangement, I pivot said post either at the bottom, as shown at $d$, Fig. 1, or at both bottom and top, to a suitable frame-work or support. This enables the entire apparatus to swing horizontally upon and to be turned entirely around with said post, if desired, which adds greatly to the convenience of the machine. Moreover, the pipe B', which has an oscillating motion on its longitudinal axis, as hereinafter set forth, in my present invention rests and oscillates in bearings $c$ formed in or supported by the bracket E, Fig. 1, attached to or the post D.

This construction and arrangement greatly relieves the strain upon the pipe and upon the devices for oscillating the same, hereinafter described. The said pipe may, therefore, be made lighter than when not supported as described; but the chief benefit derived by the improvement is the great reduction of friction in and wear upon other working parts of the machine, as hereinafter explained.

In such machines, as heretofore constructed the cylinder C was attached to the oscillating-pipe B', and the plunger therein being reciprocated by a crank directly connected with the plunger-rod, the motion of the crank which caused the reciprocation of the plunger also caused said pump and the pipe B' to oscillate with it. The object of this construction and arrangement was to impart to the pipe B connected with the pipe B', and the diaphragm pump or pumps attached to the pipe B, a vertical motion, resembling in its effect the butting of a calf's head against the udder while sucking, said pipe B being jointed at *f* in such manner that it could be made to assume any desired angle horizontally with the pipe B' by turning it on said joint *f*.

In consequence of this construction and arrangement of parts, and the want of suitable supporting-bearings for the pipe B, there resulted a constant strain on the plunger and on the said water-cylinder C, which, not only by resulting friction increased the labor of working the apparatus, but also caused rapid wear of the bearing-surfaces.

The employment of the bracket E, hereinbefore described, aids in overcoming these difficulties; but, as a further improvement, to entirely remove this source of derangement, I employ an independent oscillator, F, to actuate the pipe B', and I fix the cylinder C rigidly to the side of the post D, preferably on that side of the post opposite said oscillator.

Said oscillator, preferably, consists in a hollow cylinder, *g*, Fig. 1, attached to the pipe B' by a clamping device, hereinafter described, in which cylinder is fitted and in which plays vertically the lower end of a rigid rod, *g'*, pivoted to another rod, *g''*, to which is imparted reciprocating motion from the crank G. To the upper end of the rod *g'* is also pivoted one end of a bar, *h*, the opposite end of which is pivoted at *h'* to a lever, H, pivoted in its turn at *h''* to the post D. The amplitude of the oscillation of the oscillator F and pipe B' is controlled by the bar or link *h*, and is greater or less according as the lever H is turned upward or downward on its pivot *h''*. The arrangement described for controlling the amplitude of the oscillation is the same as was formerly employed in connection with the water-cylinder C when the same was used to oscillate the pipe B', but in that case the pipe B' was rigidly attached to the said water-cylinder. As a still further improvement connected with the independent oscillator, I employ a lever-cam, *i*, working between a fixed collar, *i'*, on the pipe B' and the attachment I, which connects the said oscillator F with said pipe. By means of such clamping device I am enabled to adjust the pipe B' on its longitudinal axis independently of its oscillation, in such manner as to elevate or lower the diaphragm-pumps A A', and thus adapt the machine far more readily to large or small, short-legged or long-legged cows, cows with very dependent udders, or contrariwise.

This feature of my present invention constitutes a very important advance from the cow-milking machines heretofore used; but I do not limit myself to the exact construction of the oscillator F, reserving the right to use any independent oscillating device to effect the same object. Neither do I limit myself to the particular clamping device described for clamping the pipe B' to the oscillator F, as other clamping devices may answer the same purpose.

In these machines, as heretofore constructed, the diaphragm-pumps were rigidly connected with each other, and attached by a rigid connection to the pipe B. As it is frequently the case that cows have teats of different lengths, difficulty was experienced in adjusting the teat-sockets to the teats.

To obviate this difficulty and to secure other advantages, I attach to the end of the said pipe B a T-connection, K, by means of a movable joint, *k*, in such manner that the said T-connection may be moved radially on the joint *k*.

To the lateral ends of the T-connection I independently attach the diaphragm-pumps A A' by the movable joints *k'*, in such manner that each of said pumps may turn vertically on its joint *k'* as a center. Moreover, somewhere between the said T-connection and the end of the pipe B', preferably at *k''*, I place still another movable joint, which permits the said T-connection and its attached pump to be turned around the longitudinal axis of said pipe.

All these movable joints are also hydraulic joints—that is, they are packed in any suitable manner to make and keep them water-tight.

The arrangement of these several movable joints described is such that any angle or position necessary to adjust the teat-sockets and pumps to cows of different heights, and to different lengths and positions of teats on the same udder, is easily and quickly obtained, adding very much to the efficiency and convenience of the machine.

In the cow-milking machines hitherto employed inconvenience was experienced by the entrance of air into the pipes. The only provision made to obviate this difficulty was a spring escape-valve, *l*, in the plunger *b*, Fig. 1. The accumulation of air in the apparatus after the water-column had been introduced, causing increase of volume, forced open the said valve, and permitted a portion of the contents of the cylinder C to escape. A portion of the air would thus escape; but this only partly removed the difficulty, as between the said pump and the said escape-valve there were numerous places higher than those each side of them, and these elevations, forming pockets, so to speak, air enough accumulated in them to render the hydraulic column elastic and to interfere with the proper action of the pumps, depending upon the incompressibility of the hydraulic column.

This difficulty is entirely removed in my present invention, and in the following manner: In the first place I attach the T-connection K to the upper part of each diaphragm-pump A and A', and I attach the pipe B to the upper part of said T-connection. The hydraulic joint $f$ is, moreover, so constructed that the passage therein is, in part, vertical, and the pipe B' connects with said passage at its upper part. The said pipe B' opens into the lowest part of the cylinder C. In this way I secure an ascending-passage for the air from the said milking-pumps to the valve $l$ without any descending parts in such passage, and constantly eliminate all air from the water-column through the said escape-valve during the working of the machine, the spring on said valve being of a strength to secure the necessary resistance for the proper working of the said milking-pumps. Near the top of each of said diaphragm-pumps, on the water side of the diaphragms, I place a vent plug or plugs, valve or valves, $m$, or pet-cocks, which also act as gages, to show when the water sides of the said pumps are filled, and which may be of any suitable kind for permitting escape of air from said pumps when filling the same with water.

The filling is done by pushing down the plunger $b$ to the bottom of the cylinder C and opening the air-escape vents $m$, then pouring water into the cylinder C until the said pumps are supplied, which is indicated by escape of water from said vents. Said vents are then closed, and more water poured in the cylinder C, till the pipes B and B' are filled.

The said plunger $b$ is operated through the plunger-rod $n$, Fig. 1, and connecting-rod $n'$, directly actuated by a winch, N, or indirectly through suitable intermediate mechanism, a fly-wheel, M, assisting in the uniform working of the apparatus. All of the operating mechanisms are attached to the upper part of the central pivoted post D, and receive motion from the said winch N.

I claim—

1. The combination, with the water-cylinder C, plunger $b$, one or more milking-pumps, A A', and a hydraulic pipe or passage connecting said cylinder with said pumps, of an independent oscillating device for oscillating said pump or pumps, substantially as and for the purpose set forth.

2. The combination, with the oscillator F, pivoted post D, one or more milking-pumps, A A', and pipes B B', of the bracket E, having the bearings $e$ for supporting the pipe B' and relieving said oscillator from strain, substantially as and for the purpose set forth.

3. The combination, with an independent oscillator and the pipe B, of a clamping device, for clamping the said pipe B to the said oscillator and rendering them adjustable relatively with each other, substantially as and for the purpose described.

4. The combination of the milking pump or pumps, the T-connection K, pipe B, water-tight joint $f$, pipe B', and the water-cylinder C, communicating through its bottom with the pipe B', all arranged to form a rising passage for air from said pump or pumps to said cylinder to prevent accumulation of air in said passage, substantially as and for the purpose specified.

5. The combination, with the cylinder C, its plunger, and the pipes B B', of the independently-adjustable milking-pumps A A', substantially as and for the purpose described.

6. The combination, with the milking-pumps A A', the T-connection K, and the pipes B B', of the movable water-tight joint $k''$, arranged between said T-connection and the pipe B', to render said T-connection and its attached pumps adjustable around the longitudinal axis of the pipe B, substantially as and for the purpose set forth.

7. The diaphragm milking-pumps, provided in their upper parts with the temporary air-vents and filling-gages $m$, substantially as and for the purposes specified.

8. The combination, with one or more milking-pumps, A A', the pipes B and B', and the independent oscillator F, of the lever H and the bar $h$, pivoted to the said oscillator and also to said lever, substantially as and for the purpose set forth.

9. The combination, with one or more milking-pumps, A A', pipes B B', independent oscillator F, fixed cylinder C, lever H, and bar $h$, of the pivoted turning-post D, supporting the said parts and devices, and the mechanism for operating said parts and devices, also attached to and supported by said post, substantially as and for the purpose described.

ALBERT A. DURAND.

Witnesses:
MICHAEL RYAN,
FRED. HAYNES.